United States Patent [19]
Krehbiel et al.

[11] 3,804,170
[45] Apr. 16, 1974

[54] METHOD OF USING OVERBASED SULFONATE WATER FLOOD ADDITIVE DERIVED FROM HEAVY COKER GAS OIL

[75] Inventors: Delmar D. Krehbiel, Lubbock, Tex.; M. Duane Gregory, Ponca City, Okla.; Charles R. Clark, Ponca City, Okla.; Carl D. Kennedy, Ponca City, Okla.

[73] Assignee: Continental Oil Company, Ponca City, Okla.

[22] Filed: Jan. 15, 1973

[21] Appl. No.: 323,463

Related U.S. Application Data

[63] Continuation-in-part of Ser. No. 208,019, Nov. 24, 1971, abandoned.

[52] U.S. Cl............. 166/270, 166/275, 252/8.55 D
[51] Int. Cl............................................ E21b 43/22
[58] Field of Search................ 166/270, 273–275, 166/305 R, 268; 252/8.55 D

[56] References Cited
UNITED STATES PATENTS

| | | | |
|---|---|---|---|
| 2,197,800 | 4/1940 | Henke et al. | 252/8.55 D |
| 3,111,984 | 11/1963 | Reisberg | 166/270 |
| 3,283,812 | 11/1966 | Ahearn et al. | 166/275 |
| 3,302,711 | 2/1967 | Dilgren | 166/270 |
| 3,302,713 | 2/1967 | Ahearn et al. | 166/275 X |
| 3,330,347 | 7/1967 | Brown et al. | 166/270 |
| 3,392,782 | 7/1968 | Ferrell et al. | 166/275 |
| 3,398,791 | 8/1968 | Hurd | 166/270 |
| 3,653,437 | 4/1972 | Gale et al. | 166/275 X |

*Primary Examiner*—Stephen J. Novosad
*Attorney, Agent, or Firm*—Ronald J. Carlson

[57] ABSTRACT

An improved anionic water flood additive and method of using same for the recovery of hydrocarbons from a petroliferous formation. The anionic water flood additive is an overbased sulfonate derived from heavy coker gas oil.

12 Claims, No Drawings

METHOD OF USING OVERBASED SULFONATE WATER FLOOD ADDITIVE DERIVED FROM HEAVY COKER GAS OIL

This application is a continuation-in-part application of application Ser. No. 208,019, filed on Nov. 24, 1971, now abandoned; and has copendency therewith.

BACKGROUND OF THE INVENTION

1. Field of the Invention

This invention relates to an improved anionic water flood additive. In one aspect the invention relates to the use of said anionic water flood additive for recovery of hydrocarbons from petroliferous subterranean strata. In yet another aspect, this invention relates to a process for the recovery of viscous oils from low permeability formations by the use of an overbased sulfonate derived from heavy coker gas oil.

2. Brief Description of the Prior Art

A large percentage of the oil in petroliferous strata is held within the rock of the strata by the surface forces between the rock, the oil and the formation water. As a result, a substantial portion of this oil usually remains in the rock even when wells traversing the strata are no longer productive. Various secondary recovery techniques, such as thermal recovery, gas injection and water flooding, have been suggested for the recovery of this fixed oil which remains in the formation after it can no longer be produced by primary recovery methods. Of these secondary recovery techniques, water flooding is quite commonly chosen, and a multitude of methods has been suggested for improving the efficiency and economy obtained from the practice. Such methods frequently include incorporation of a water-soluble surfactant in the water flood. Typical surfactants which have been proposed for this purpose include alkyl pyridinium slats, sodium lauryl sulfate, certain sulfonates, glycosides, sodium oleates, quaternary ammonium salts and the like. The use of such surfactants has arisen because it is widely recognized that a low interfacial tension between the surfactant flood water and the reservoir crude is essential to the improvement of recovery efficiencies.

Recently, it has been proposed that nonionic surfactant solutions, such as a polyoxyethylene-polyoxypropylene copolymer containing solution be injected into the formation through a first of at least two well bores to thereby displace the hydrocarbons towards a second well bore. The nonionic surfactant flood is then followed by the injection of a slug of aqueous caustic into the formation through the first well bore to displace the hydrocarbon and the surfactant toward the second bore. The caustic slug has a basicity at least 1.5 pH levels greater than that of the native formation water. However, the use of the nonionic surfactant has not fully met the needs of a desirable water flood additive surfactant composition and new compositions are constantly being sought which will allow one to recover the residual oil remaining in the formation. Further, the surfactant ingredients of the prior art have suffered from the lack of availability or cost and thus have not satisfied this long felt need.

OBJECTS OF THE INVENTION

An object of the invention is to provide an improved water flood additive and method for using same in the secondary recovery of hydrocarbons from oil-bearing formations.

Another object of the present invention is to provide an improved water flood additive which is inexpensive and readily available in sufficient quantities to satisfy present and future needs.

Another object of the invention is to provide a water flood additive composition which will be effective in recovering the tertiary oil in the formation and which can be readily processed.

These and other objects, advantages, and features of the invention will become apparent to those skilled in the art from a reading of the following detailed description.

SUMMARY OF THE INVENTION

According to the present invention we have now found an improved anionic water flood additive which consists of an overbased sulfonate derived from heavy coker gas oil.

Further, according to the invention we have found that when employing said anionic water flood additive that hydrocarbons in substantial yields can be recovered from petroliferous formations.

One method of employing the anionic water flood additive composition of the present invention includes the step of injecting a slug of the overbased sulfonate derived from heavy coker gas oil into the formation to thereby displace the hydrocarbon from the formation so that one can recover the displaced hydrocarbon. Additional hydrocarbon can be recovered, if desired, by injecting an effective amount of a slug of aqueous alkali metal hydroxide and/or aqueous alkali metal carbonate into the petroliferous formation after the overbased slug has been injected.

Another method of removing the hydrocarbons from a petroliferous formation is by injecting a first slug of a sulfonate derived from heavy coker gas oil into the petroliferous formation followed by an effective amount of an aqueous alkali metal hydroxide solution and/or an aqueous metal carbonate solution slug so that the overbased composition is produced in situ by the contacting of the sulfonate slug and the alkali metal hydroxide slug and/or aqueous alkali metal carbonate slug.

DESCRIPTION OF THE PREFERRED EMBODIMENTS

As previously stated, the present invention is an improved anionic water flood additive and a method of using same for the recovery of hydrocarbons from a petroliferous formation. The anionic water flood additive is derived from heavy coker gas oil which is sulfonated to yield sulfonic acid precursors. These sulfonic acid derivatives are then neutralized and overbased to produce the anionic water flood additive for use in the present invention.

Heavy coker gas oil is a term well-known in the oil refining industry for a specific fraction recovered from the overhead vapors of the coker unit. Basically, the heavy coker gas oil is produced by supplying to the coke unit the heaviest materials obtained from a crude topping unit. As these materials are thermally decomposed in the coker unit, vapors are produced overhead. These overhead vapors are then collected and fractionated in various fractions or cuts. The fraction recovered having a boiling range of from about 410° to 910° F is known as heavy coker gas oil.

Once the desired heavy coker gas oil has been obtained it is directly sulfonated and the sulfonated materials are preferably segregated from the unreacted materials. Any suitable sulfonation procedure which is well known in the art can be employed in the sulfonation of the heavy coker gas oil. For example, the sulfonating agent may be either oleum, $SO_3$, mixtures of $SO_3$ and $SO_2$ or chlorosulfonic acid. Furthermore, the sulfonation can be carried out by either a batch-type process or a continuous falling film reactor process. However, we have found that when a batch-type sulfonation process is employed for the sulfonation of heavy coker gas oil and the resulting sulfonic acid constituent is subsequently neutralized and overbased, as hereinafter described, an anionic water flood additive is produced which is superior, as to its oil recovery properties, to an additive produced by employing a continuous falling film sulfonation process, when field brine is encountered.

Neutralization of the sulfonic acids obtained by sulfonation of the heavy coker gas oil to produce the alkali metal salts may also be carried out in any one of several methods well known in the art. The alkali metal hydroxides and/or alkali metal carbonates are employed in the neutralization step above.

The term base component as used in this application includes alkali metal hydroxides and alkali metal salts which react with sulfonic acids to produce alkali metal sulfonates. Examples of such alkali metal hydroxides and carbonates, i.e., base components, include sodium hydroxide, potassium hydroxide, lithium hydroxide, sodium carbonate, sodium bicarbonate, potassium carbonate, and the like. Especially desirable results have been obtained wherein the alkali metal hydroxides are used.

As previously stated, the improved anionic water flood additive of the present invention is an overbased sulfonate derived from heavy coker gas oil. Overbased sulfonates, as this term is employed in this application, are defined to be mixtures of alkali metal sulfonates plus base component wherein the ratio: "weight of excess base component/weight of alkali metal sulfonate" has a value of about 0.03 to 2.0. Excess base component is that amount of base component present which is not employed to neutralize the sulfonic acid precursor to the sulfonate. Particularly desirable results are obtained when the ratio has a value of about 0.20 to about 1.0. Thus, it is apparent that when one merely neutralizes the sulfonates and injects the neutralized products into the formation that one must add a sufficient amount of the base component, e.g., the alkali metal hydroxide or the aqueous alkali metal carbonate in a second slug to insure that the water flood additive composition formed in situ in the formation is overbased in the prescribed ranges. When preparing the water flood additive composition of the present invention to be injected into the formation as the overbased composition, it is evident that the neutralization step need not be an intermediate step but rather that sufficient base component can be added to the sulfonic acid derivative to produce a product containing the above prescribed amount of overbasing.

In describing the use of the anionic water flood additive of the present invention, two methods of injecting said additive into the petroliferous strata will be discussed. However, it should be understood that neither method is preferred over the other and that the particular method chosen will depend to a large extent upon the facilities available at the well site.

One method of employing the anionic water flood additive composition of the present invention is to inject a slug of the neutralized sulfonic acid, that is, the sulfonate derived from heavy coker gas oil, through a well bore into the petroliferous subterranean strata from which the additional hydrocarbon is to be removed. After the sulfonate slug has thoroughly been dispersed into the strata an effective amount of an aqueous base component solution such as alkali metal hydroxide solution and/or an aqueous alkali metal carbonate solution in the form of a second slug, is introduced into the strata to allow formation of the water flood additive composition in situ in the subterranean strata. Experimental results have shown that when employing such a method a sufficient amount of the alkali metal containing solution must be injected into the formation to assure that the water flood additive will be overbased such that the ratio of "weight of excess base component/weight of sulfonate" is in the range of 0.03 to 2.0. If sufficient caustic is not added to reach the lower ratio of 0.03, minimum desirable results are not obtained. Likewise, problems have been encountered when the amount of overbasing is beyond the upper limit of 2.0, the problems being ones of viscosity and handling of the materials.

The second system which can be employed in using the anionic water flood additive composition of the present invention involves producing the overbased sulfonate and injecting the overbased sulfonate derived from heavy coker gas oil directly into the petroliferous subterranean strata as one slug. When employing this procedure the same limitations as the overbased sulfonate apply as to that described in the process above. While the overbased sulfonate derived from heavy coker gas oil has shown remarkable properties as a water flood additive, additional tertiary oil can be recovered by injecting an effective amount of an aqueous base component such as aqueous alkali metal hydroxide solution and/or aqueous alkali metal carbonate solution into the formation which has previously been contacted with the overbased sulfonate composition. The amount and concentration of the aqueous alkali metal containing solution employed can vary widely. However, most desirable results have been obtained wherein the concentration of the base component in the solution ranges from about 0.5 to 50 weight percent and the amount of solution injected into the formation is from about 10 to 1000 volume percent, based on the amount of the sulfonate containing slug injected into the formation.

Field brine is commonly encountered in an oil recovery operation. This brine has often had a deleterious effect on water flood additives used for secondary and-/or tertiary oil recovery. However, we have found that no adverse effects on oil recovery are detected when employing the overbased sulfonate derived from heavy coker gas oil when such field brine is encountered. In fact, desirable results have been obtained when the reservoir contains a field brine having from about 0.5 to 10 percent salt. Thus, when a fresh water field is being treated it may be desirable to incorporate into the slug of said anionic water flood additive a sufficient amount of brine solution to provide a brine level in the reservoir of about 0.5 to 10 percent salt.

In order to more fully explain the present invention, the following examples are given. However, it is to be understood that the examples are not intended to function as limitations on the invention as described and claimed hereafter.

Example I

A series of experiments were conducted to evaluate the oil recovery properties of the anionic water flood additive of the present invention. In each experiment 12 inches × 2 inches × 2 inches Berea cores were evacuated under vacuum and then saturated with 5 weight percent NaCl brine. The brine saturated cores were reduced to irreducible water saturation with 80 Pale oil or a highly refined mineral oil and then water flooded to residual oil saturation with a sodium chloride brine solution. The concentration of the brine solution employed in this water flood step was varied to determine the effect of salt on tertiary oil recovery.

Two percent pore volume slugs of various water flood additives (calculated on the basis of the additive per se) were injected into the cores as an aqueous mixture containing 2–15 percent sulfonate by weight and the tertiary water flood was conducted at 40 cc per hour, a flow rate equivalent to 6–7 feet per day to determine their effectiveness as oil recovery additives. The overbased anionic water flood additive compositions employed were prepared by sulfonating heavy coker gas oil neutralizing the sulfonate and then adding 50 weight percent of the base component to the neutralized sulfonic acids. Sulfonation of the heavy coker gas oil was carried out by both a batch-type process and a continuous falling film type process. The final additive composition contained the equivalent to about 4 percent excess of the hydroxide, and 2 to 15 percent sulfonate by weight. All of the oil recovery runs were conducted at 130° F. The results of the experiments are tabulated below.

10 percent field brine is encountered. The data further shows that a batch-type sulfonation procedure produces a product which has better oil recovery properties than products produced by a continuous process when a brine containing from about 0.1 to 4 weight percent salt is encountered in the reservoir formation.

Example II

Experiments were conducted to determine the effect on oil recovery of injecting a slug of base behind the sulfonate solution. Substantially the same procedure was employed as recited in Example I except that the cores were water flooded to residual oil saturation with a 5 weight percent sodium chloride brine solution and after the initial run was completed a 2 percent slug of NaOH* was injected into the core in a sufficient amount to produce a predetermined amount of excess NaOH. The results of these experiments are as follows:

TABLE II

| Surfactant | Excess NaOH (Wt.%) | Ratio[1] | Volume of Tertiary Oil Recovered (% of Pore Volume) |
|---|---|---|---|
| **Heavy Coker Gas Oil | 0 | | 5.2 |
| Aqueous NaOH Slug | 10 | 0.67 | 5.2 |
| Total Recovery | | | 10.4 |
| **Heavy Coker Gas Oil | 0 | | 5.2 |
| Aqueous NaOH Slug | 20 | 1.33 | 2.7 |
| Total Recovery | | | 7.9 |
| **Heavy Coker Gas Oil | 4 | 0.27 | 9.0 |
| Aqueous NaOH Slug | 10 | 0.67 | 1.1 |
| Total Recovery | | | 10.1 |

* Pore volume percent of an aqueous solution containing 4 weight percent NaOH.
** Sulfonate Derivative.
(1) Ratio is: weight of excess base component (NaOH) weight of surfactant.

The above data clearly indicates that the amount of oil recovered can readily be increased when an additional slug of the base component is injected into the formation following injection of either the neutralized sulfonate and/or overbased sulfonate into said formation.

TABLE I

| Surfactant | Type Sulfonation Process | Brine Solution Wt. % Salt | Ratio[1] | Excess NaOH (Wt. %) | Volume of Tertiary Oil Recovered (% of Pore Volume) |
|---|---|---|---|---|---|
| Nonionic | | 5 | 0.27 | 4 | 0.2 |
| Cationic | | 5 | .27 | 4 | 0 |
| *Heavy Coker Gas Oil | Continuous | 5 | 0 | 0 | 5.2 |
| Do | do | 5 | .27 | 4 | 9.0 |
| Do | do | 5 | .14 | 2 | 7.1 |
| Do | do | 2 | .27 | 4 | 9.5 |
| Do | do | 1 | .27 | 4 | 6.5 |
| Do | do | 0.2 | .27 | 4 | 4.9 |
| Do | do | 10 | .27 | 4 | 6.5 |
| Do | Batch | 0.1 | .27 | 4 | 9.5 |
| Do | do | 0.5 | .27 | 4 | 10.0 |
| Do | do | 0.1 | .27 | 4 | 5.7 |
| Do | do | 5 | .27 | 4 | 9.0 |

*Sulfonate Derivative.
[1] Ratio is: weight of excess base component (NaOH)/weight of surfactant.

From the preceding data it is readily apparent that the anionic water flood additive composition of the present invention can be employed for the recovery of the tertiary oil whereas nonionic and cationic compositions have only minor affect. Further, the data clearly shows that the criticality of the overbase concept herein before discussed and the superior results obtained when employing the overbased sulfonate derived from heavy coker gas oil when from about 0.5 to

Having thus described the invention, we claim:

1. A method for recovering hydrocarbons from a petroliferous formation which comprises injecting into said formation an effective amount of an anionic water flood additive which comprises an overbased sulfonate derived from heavy coker gas oil, said overbased sulfonate containing an excess of base component over that required to neutralize the sulfonic acid precursor of said sulfonate, such that the ratio of weight of excess base component/weight of sulfonate is about 0.03 to about 2.0, and withdrawing hydrocarbon from said formation which has been displaced by said anionic water flood additive.

2. The method of claim 1 wherein said heavy coker gas oil has a boiling range of from about 410° to 910° F, and the base component employed to neutralize and overbase said sulfonic acid precursor is selected from the group consisting of an alkali metal hydroxide and an alkali metal carbonate.

3. The method of claim 2 wherein the ratio is about 0.20 to about 1.0.

4. The method of claim 3 wherein the base component is selected from the group consisting of NaOH, LiOH, KOH, Na$_2$CO$_3$, Li$_2$CO$_3$ and K$_2$CO$_3$.

5. The method of claim 4 which includes the step of injecting into said formation subsequent to said anionic water flood additive an additional amount of from about 10 to 1,000 volume percent, based on the total volume of the sulfonate containing slug, of an aqueous base component solution, said base component solution containing from about 0.5 to 50 weight percent of the base component.

6. The method of claim 4 which includes the step of admixing an effective amount of an aqueous brine solution with said overhead anionic water flood additive to provide a salt level of about 0.5 to 10 weight percent in the aqueous liquid of the formation following injection.

7. The method of claim 6 wherein the sulfonation step in the preparation of said additive is carried out in a batch-type process and the aqueous brine solution admixed with said additive in an amount sufficient to provide a brine solution containing from about 0.1 to 4 weight percent salt in said formation.

8. The method of claim 6 which includes the steps of forming said anionic water flood additive in situ by the sequential steps of:

a. injecting into said formation an effective amount of a neutralized sulfonic acid derivative of said heavy coker gas oil, b. injecting into said formation an effective amount of base component selected from the group consisting of an aqueous alkali metal hydroxide solution and an aqueous alkali metal carbonate solution to produce an overbased mixture from said sulfonate and said base component, said overbased mixture containing an excess of base component such that the ratio: weight of excess base component/weight of sulfonate is about 0.20 to about 1.0, and c. recovering from said formation hydrocarbon displaced by said overbased mixture.

9. The method of claim 8 wherein said heavy coker gas oil has a boiling range of from about 410° to 910° F, and the base component is selected from the group consisting of an alkali metal hydroxide and an alkali metal carbonate.

10. The method of claim 8 wherein said base component is selected from the group consisting of NaOH, LiOH, KOH, Na$_2$CO$_3$, K$_2$CO$_3$ and Li$_2$CO$_3$.

11. The method of claim 10 which includes the step of admixing a brine solution with said anionic water flood additive sufficient to provide about 0.5 to 10 weight percent salt in the aqueous liquid in the formation after injection of the additive.

12. The method of claim 11 wherein the sulfonation step in the preparation of the additive is carried out in a batch-type process and the brine solution and salt concentration thereof admixed with the additive is in an amount sufficient to provide an aqueous brine solution in the formation having a salt concentration of about 0.1 to 4 weight percent.

* * * * *